R. F. KREITER.
TOOL JOINT.
APPLICATION FILED FEB. 14, 1920.

1,372,238.

Patented Mar. 22, 1921.

INVENTOR
Richard F. Kreiter
BY
Hardway & Cathey
ATTORNEYS.

UNITED STATES PATENT OFFICE.

RICHARD F. KREITER, OF HOUSTON, TEXAS.

TOOL-JOINT.

1,372,238. Specification of Letters Patent. Patented Mar. 22, 1921.

Application filed February 14, 1920. Serial No. 358,710.

*To all whom it may concern:*

Be it known that I, RICHARD F. KREITER, a citizen of the United States, residing at Houston, in the county of Harris and State of Texas, have invented certain new and useful Improvements in Tool-Joints, of which the following is a specification.

This invention relates to new and useful improvements in a tool joint.

One object of the invention is to provide a tool joint which has been specially designed for connecting the sections of a drill stem used in rotary drilling. However the tool joint may be used for connecting sections of rods or pipes generally and is not necessarily confined in its application to drill stems.

Another object is to provide a tool joint whose members may be readily locked together, against accidental separation, but in such a manner that they may be easily separated when desired.

With the above and other objects in view the invention has particular relation to certain novel features of construction, operation and arrangement of parts, an example of which is given in this specification and illustrated in the accompanying drawings wherein:—

Figure 1:
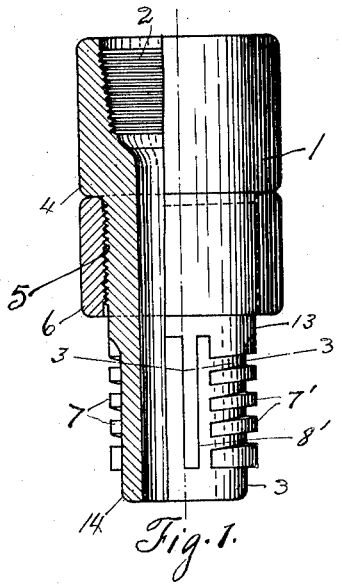
Figure 1 shows a side view of the male member of the joint, partially in section.
Figure 3:
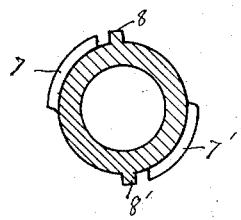
Fig. 3 shows a transverse sectional view of the male member taken on the line 3—3 of Fig. 1
Figure 2:
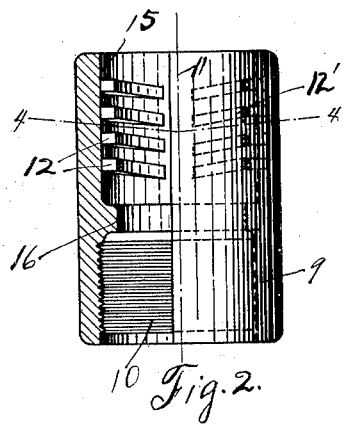
Fig. 2 shows a side view of the female member partially in section.
Figure 4:
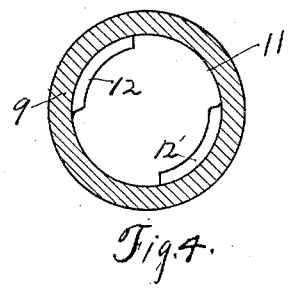
Fig. 4 shows a transverse sectional view of the female member taken on the line 4—4 of Fig. 2.

Referring now more particularly to the drawings wherein like numerals of reference designate similar parts in each of the figures the numeral 1 designates the male member which is internally threaded at 2 to receive the externally threaded end of a pipe or rod. The other end of the male member is reduced forming a pin 3 and an annular shoulder 4. Adjacent this shoulder the pin has the relatively fine threads 5 which receive the annular locknut 6. Beyond this nut the pin has two series of relatively coarse segmental threads 7 and 7' said series being oppositely arranged and spaced apart. In practice the threads are all right hand threads and at their right hand ends the segmental threads 7 and 7' are closed, that is they terminate in the vertical ribs 8 and 8' formed integral with the pin 3, and which form stops to limit the backward turning of either member relative to the other.

One end of the female member 9 is internally threaded at 10 to receive the externally threaded end of a rod or pipe and the other end of the member 9 has a box 11 which is formed with two series of relatively coarse segmental threads 12 and 12', said series being oppositely arranged and spaced apart.

In application the nut 6 is screwed on the pin 3 up against the shoulder 4 and the pin is then inserted into the box 11, until the female member abuts against the nut 6, said pin being turned so that the segmental threads of one member will pass through the spaces between the corresponding threads of the other member. One of said members is then turned backwardly, thereby causing the segmental threads of the members to intermesh, and this backward rotation is continued until the threads of the female member contact with and are stopped by the stops 8, 8'. This backward rotation will separate the female member from the nut 6, which is screwed down against the adjacent end of said female member. This nut will now prevent either member from turning in one direction and the stops 8, 8' will prevent them from turning in the other direction and they will thereby be locked together and can only be released by screwing the nut 6 away from said female member.

In order to give additional strength to the joint the pin 3 has a blank space 13 adjacent the threaded section 5 and the end thereof is also formed with a blank space 14, said blanks 13 and 14 fitting snugly in corresponding blank bearings 15 and 16 in the female member 9, when the members of the joint are screwed together, the joint will thus be greatly strengthened and will not be liable to work loose when subjected to the strain incident to drilling.

What I claim is:

1. A tool joint, including a member having a pin, a member having a box, said pin and box having segmental threads adapted to intermesh by the relative turning of said members, means carried by one member and positioned to abut against the threads of the other member to limit their relative rotation in one direction, and means for locking said members against relative rotation in the other direction.

2. A tool joint, including two members, one formed with a pin and the other having a box adapted to receive said pin, segmental threads carried by the pin and box respectively and adapted to intermesh when relatively rotated, a stop carried by one member which abuts against the threads of the other member to limit their relative rotation in one direction, and a lock nut carried by one member and adapted to engage against the other member to lock said members against relative rotation in the other direction.

3. A tool joint, including a member formed with a pin, a member formed with a box, segmental threads carried by the pin and box respectively and adapted to intermesh when the pin is inserted into the box and turned, stops carried by one member which abut against the threads of the other member to limit the relative rotation of said members in one direction, and a lock nut on the male member adapted to be screwed against the adjacent end of the female member to prevent the relative rotation of said members in the other direction.

In testimony whereof I have signed my name to this specification in the presence of two subscribing witnesses.

RICHARD F. KREITER.

Witnesses:
Wm. A. Cathey,
R. M. Smith.